United States Patent Office 2,963,452
Patented Dec. 6, 1960

2,963,452

STABLE DISPERSIONS OF RUBBERY SUBSTANCES AND METHOD OF PREPARING SAME

Gustav Sinn, Bergisch Neukirchen, and Herbert Bartl, Koln-Stammheim, Germany, assignors to Farbenfabriken Bayer Aktiengesellschaft, Leverkusen, Germany, a corporation of Germany No Drawing. Filed Dec. 26, 1957, Ser. No. 705,101

Claims priority, application Germany Dec. 31, 1956

11 Claims. (Cl. 260—4)

The present invention relates to aqueous dispersions of rubbery substances, a process of producing such dispersions and to compositions of matter useful for the production of such dispersions. It is known that aqueous dispersions of rubbery substances can be prepared by first of all dissolving said substance in an organic solvent, emulsifying this solution by means of soap-like emulsifiers or wetting agents in water and distilling off the organic solvents from the emulsion which is formed. This process is very complicated and therefore unsatisfactory. Furthermore, the latices of said rubbery substances obtained by emulsion polymerization usually contain large quantities of wetting agents, due to which the moulded elements such as for example films prepared from these latices are given a high and in many cases an undesirable swelling capacity in water.

It has now been found that rubber and rubber-like synthetic polymers can be converted into satisfactory stable emulsions even without using organic solvents if these products, prior to being dispersed in water, are mixed with synthetic copolymers of (1) half esters of α-β-ethylenically unsaturated dicarboxylic acids with alcohols having at least 8 carbon atoms and (2) ethylenically unsaturated monomers selected from the group consisting of monovinylaromatic compounds such as styrene and styrenes substituted in the aromatic nucleus by alkyl groups, such as methyl, ethyl, isopropyl, butyl, organic vinylesters, such as vinylacetate, vinylpropionate, vinylbenzoate, esters of acrylic or methacrylic acid with aliphatic saturated alcohols having 4 to 20 carbon atoms, such as butylacrylate, dodecylmethacrylate, and conjugated diolefins having 4 to 6 carbon atoms, such as butadiene, isoprene, chloroprene. Suitable half esters are for instance the half esters of maleic or fumaric acid with saturated aliphatic alcohols having 8 to 20 carbon atoms, such as decylalcohol, dodecylalcohol, octadecylalcohol, condensation products of alkylated monohydric phenols such as dodecylphenol with at least one mole of an alkylenoxyde such as ethylenoxide, propylenoxide. Of especial importance are such copolymers which are obtained from 1 mol of a half ester as disclosed above and 1–2 moles of the aforementioned copolymerization components. These copolymers may be obtained by the ordinary polymerization methods preferably in blocks or solution with the aid of radical-forming activator, such as by the process disclosed in French specification 1147.579 and in German application F 16.622 IVc/39c (DAS 1,002.947) published February 21, 1957.

In order to produce a good dispersion effect, there are advantageously used about 3–30% by weight of polymers containing carboxyl groups, based on the substance of high molecular weight which is to be dispersed, although the said percentages are not to represent any limitations of the quantity to be used.

The incorporation of the polymers containing carboxyl groups into the substances of high molecular weight which are to be emulsified can for example be carried out on roll mills. Depending on the properties which are required of the emulsion to be prepared, it is possible to incorporate fillers, plasticizers, resins, dyes, vulcanizing agents and other dispersing agents. The homogeneous mass can then be kneaded to a very finely dispersed emulsion in an intensively acting mixing device, for example a mixing or dissolving kneader, with water, which may contain alkali and which if necessary also contains protective colloids or other dispersing agents such as for example casein, polyvinylalcohol, gelatine. The protective colloids are preferably applied in amounts of 3–20 percent by weight as calculated on the weight of rubbery substance. Casein in ammoniacal solution has proved to be particularly suitable as a supplementary aid to emulsification. The pH value of the emulsion is adjusted during preparation preferably to 5–12.

In accordance with the process of the invention, substances of high molecular weight which can be converted into emulsions are generally those which are capable of being plasticized under conditions of rubber compounding such as for example polymers of butadiene, isoprene, isobutylene, chlorobutadiene, elastomeric copolymers of butadienes with styrene and/or acrylonitrile, chlorosulphonated polyethylene, polyethylene having a density of 0.915 to 0.935, unvulcanized silicone rubber.

The emulsions which may be produced in a concentration of about 30–75% (based on the weight of dispersed substances) are very stable and can readily be diluted several times. The substances of high molecular weight which dry out from the emulsions are characterized by an increased resistance to water and good bonding strength as compared with those obtained from other emulsions. The emulsions may be used as adhesives, coating and impregnation agents for metals, glass, plastics and textiles.

In the following examples the parts indicated are parts by weight.

Example 1

100 parts of natural rubber are masticated in the cold for about 15 minutes on a roll, and then about 10 parts of a copolymer of 65 parts of maleic acid-octadecyl semi-ester, 20 parts of styrene, butadiene or isoprene and 15 parts of methacrylic acid dodecyl ester are admixed therewith. The mixture has 150 parts of a 10% casein solution slowly added thereto in a kneader. A finely divided stable emulsion is formed which may be used as an adhesive especially for bonding paper to plastics such as polyethylene.

Example 2

The following mixture is prepared on the roll: 100 parts of (1) an elastomeric copolymer of 65 parts by weight of butadiene and 35 parts of acrylonitrile or an elastomeric copolymer of 70 parts of butadiene and 30 parts of styrene, (2) 15 parts of a copolymer of 1 mol of maleic acid dodecyl semi-ester and 1.1 mols of styrene, 5 parts of oleic acid, 5 parts of kaolin, 3 parts of sulfur, 1 part of a vulcanizing accelerator, 0.05 part of carbon black, 10 parts of a soft resin, for example polyvinyl methyl ether.

The mixture can be satisfactorily emulsified in a kneader with the aid of 100 parts of a 10% casein solution or a 2% soap solution. The emulsion may be used for impregnating fabrics.

Example 3

100 parts of a polydimethylsiloxane as produced by the process of Example 1 of U.S. specification 2,448,756 are thoroughly homogenized in a solution kneader with 10 parts of a copolymer of 65 parts of maleic acid-octadecyl semi-ester, 20 parts of styrene and 15 parts of methacrylic acid dodecyl ester and 5 parts of oleic acid. 100 parts of a 15% aqueous ammoniacal casein solution are then added slowly while stirring well.

The emulsion may be used as mold release agent.

Example 4

The following mixture is prepared on a roll mill: 100 parts of chlorosulphonated polyethylene, 10 parts of paraffin oil, 20 parts of a copolymer of 1 mol of maleic acid dodecyl semi-ester and 1.1 mols of styrene, 5 parts of oleic acid.

The mixture can be satisfactorily emulsified in a solution kneader with 120 parts of a 10% aqueous ammoniacal casein solution. The emulsion obtained may be used as impregnating agent for fabrics.

Example 5

100 parts of an elastomeric polymer of isobutylene are masticated on the roll for about 20 minutes, and then about 20 parts of a copolymer disclosed in Example 1 and 5 parts of oleic acid are admixed therewith. The mixture has 125 parts of a 10% aqueous casein solution slowly added thereto in a kneader. A finely divided stable emulsion is formed which amy be used as an impregnating and coating agent.

What we claim is:

1. A process of compounding a solid rubbery organic polymer of high molecular weight into a form which can be dispersed in water to form a stable aqueous dispersion without the use of organic solvents, which consists essentially of intimately mixing said solid rubbery polymer, prior to dispersing it in water, with about 3-30% by weight of a copolymer of (a) one mole of a half ester of an alpha,beta-ethlenically unsaturated dicarboxylic acid with a monohydric saturated alcohol of 8-20 carbon atoms, and (b) 1-2 moles of at least one monomer selected from the group consisting of a monovinyl aromatic compound, a vinyl ester of a lower fatty acid, a conjugated diolefin of 4-6 carbon atoms, and esters of acrylic and methacrylic acid with a saturated aliphatic monohydric alcohol of 4-20 carbon atoms; said copolymer being the sole emulsifying agent in said dispersion.

2. A new composition of matter consisting essentially of a vulcanizable intimate mixture of a solid rubbery organic polymer of high molecular weight and 3-30% by weight, based on the weight of said rubbery polymer, of a copolymer of (a) one mole of a half ester of an alpha,beta-ethylenically unsaturated dicarboxylic acid with a monohydric saturated alcohol of 8-20 carbon atoms, and (b) 1-2 moles of at least one monomer selected from the group consisting of a monovinyl aromatic compound, a vinyl ester of a lower fatty acid, a conjugated diolefin of 4-6 carbon atoms, and esters of acrylic and methacrylic acid with a saturated aliphatic monohydric alcohol of 4-20 carbon atoms.

3. Composition of claim 2 wherein said copolymer is derived from a half ester of maleic acid with a monohydric saturated alcohol of 8-20 carbon atoms.

4. Composition of claim 2 wherein said rubbery polymer is natural rubber and said copolymer is prepared from one mole of mono-octadecyl maleate and 1-2 moles of styrene, butadiene, and dodecyl methacrylate.

5. Composition of claim 2 wherein said rubbery polymer is a copolymer of butadiene and acrylonitrile, which is mixed with a copolymer of mono-dodecyl maleate and styrene.

6. Composition of claim 2 wherein said rubbery polymer is polydimethylsiloxane, and said copolymer is a copolymer of mono-octadecyl maleate, styrene, dodecyl methacrylate, and oleic acid.

7. Composition of claim 2 wherein said rubbery polymer is chlorosulphonated polyethylene and said copolymer is a copolymer of mono-dodecyl maleate, styrene, and oleic acid.

8. Composition of claim 2 wherein said rubbery polymer is polyisobutylene and said copolymer is a copolymer of mono-octadecyl maleate, styrene, butadiene, dodecyl methacrylate, and oleic acid.

9. A stable aqueous dispersion of a rubbery organic polymer of high molecular weight, said dispersion consisting essentially of about 3-30% by weight, based on the weight of said rubbery polymer, of a copolymer of (a) one mole of a half ester of an alpha,beta-ethylenically unsaturated dicarboxylic acid with a monohydric saturated alcohol of 8-20 carbon atoms, and (b) 1-2 moles of at least one monomer selected from the group consisting of a monovinyl aromatic compound, a vinyl ester of a lower fatty acid, a conjugated diolefin of 4-6 carbon atoms, and esters of acrylic and methacrylic acid with a saturated aliphatic monohydric alcohol of 4-20 carbon atoms; said copolymer serving as both a dispersing and emulsifying agent.

10. A process of dispersing a solid rubbery organic polymer of high molecular weight in order to form a stable aqueous dispersion which consists essentially of preparing an intimate mixture of said solid rubbery polymer with about 3-30% by weight of a copolymer of (a) one mol of a half ester of an alpha,beta-ethylenically unsaturated dicarboxylic acid with a monohydric saturated alcohol of 8-20 carbon atoms, and (b) 1-2 mols of at least one monomer selected from the group consisting of a monovinyl aromatic compound, a vinyl ester of a lower fatty acid, a conjugated diolefin of 4-6 carbon atoms, and esters of acrylic and methacrylic acid with a saturated aliphatic monohydric alcohol of 4-20 carbon atoms; and dispersing said mixture in an aqueous medium containing a protective colloid selected from the group consisting of casein, gelatin, and polyvinyl alcohol.

11. Process of claim 10 wherein the pH of the dispersion is adjusted to about 5-10 during its preparation.

References Cited in the file of this patent

UNITED STATES PATENTS 2,798,062    Contois    July 2, 1957